United States Patent [19]

Oota et al.

[11] Patent Number: 4,532,558
[45] Date of Patent: Jul. 30, 1985

[54] PICTURE RECORDING APPARATUS

[75] Inventors: Tadashi Oota, Tokyo; Koichiro Kawamura, Shonancho, both of Japan

[73] Assignee: Nippon Kogaku K.K., Tokyo, Japan

[21] Appl. No.: 487,215

[22] Filed: Apr. 21, 1983

[30] Foreign Application Priority Data

Apr. 27, 1982 [JP] Japan .................................. 57-69499

[51] Int. Cl.³ .............................................. H04N 5/78
[52] U.S. Cl. ..................................... 360/35.1; 358/906
[58] Field of Search ...................... 360/33.1, 35.1, 14.1, 360/38.1; 358/335, 906, 139, 160, 213; 382/50, 54

[56] References Cited

U.S. PATENT DOCUMENTS 4,131,919 12/1978 Lloyd et al. ........................ 358/906
4,262,301 4/1981 Erlichman ............................ 358/906
4,415,937 11/1983 Nishizawa et al. .................. 358/335
4,456,931 6/1984 Toyoda et al. ...................... 358/335

Primary Examiner—Donald McElheny, Jr.
Attorney, Agent, or Firm—Michael N. Meller

[57] ABSTRACT

A picture recording apparatus is capable of easily confirming the quality or recorded condition of a still picture signal stored in a memory device. The memory device includes a plurality of memory units and whether the still picture signal corresponding to one frame and stored in the memory device is "good" or "bad" is discriminated by a discriminator before the next photographing. Where the apparatus includes an erase head, if the discrimination results in "bad", the content of the corresponding memory unit is erased and the content resulting from the next photographing is stored automatically in the corresponding memory unit. If the discrimination results in "good" in the apparatus or if the apparatus has no erase head, after the discrimination the content resulting from the next photographing is automatically stored in the next memory unit.

12 Claims, 5 Drawing Figures

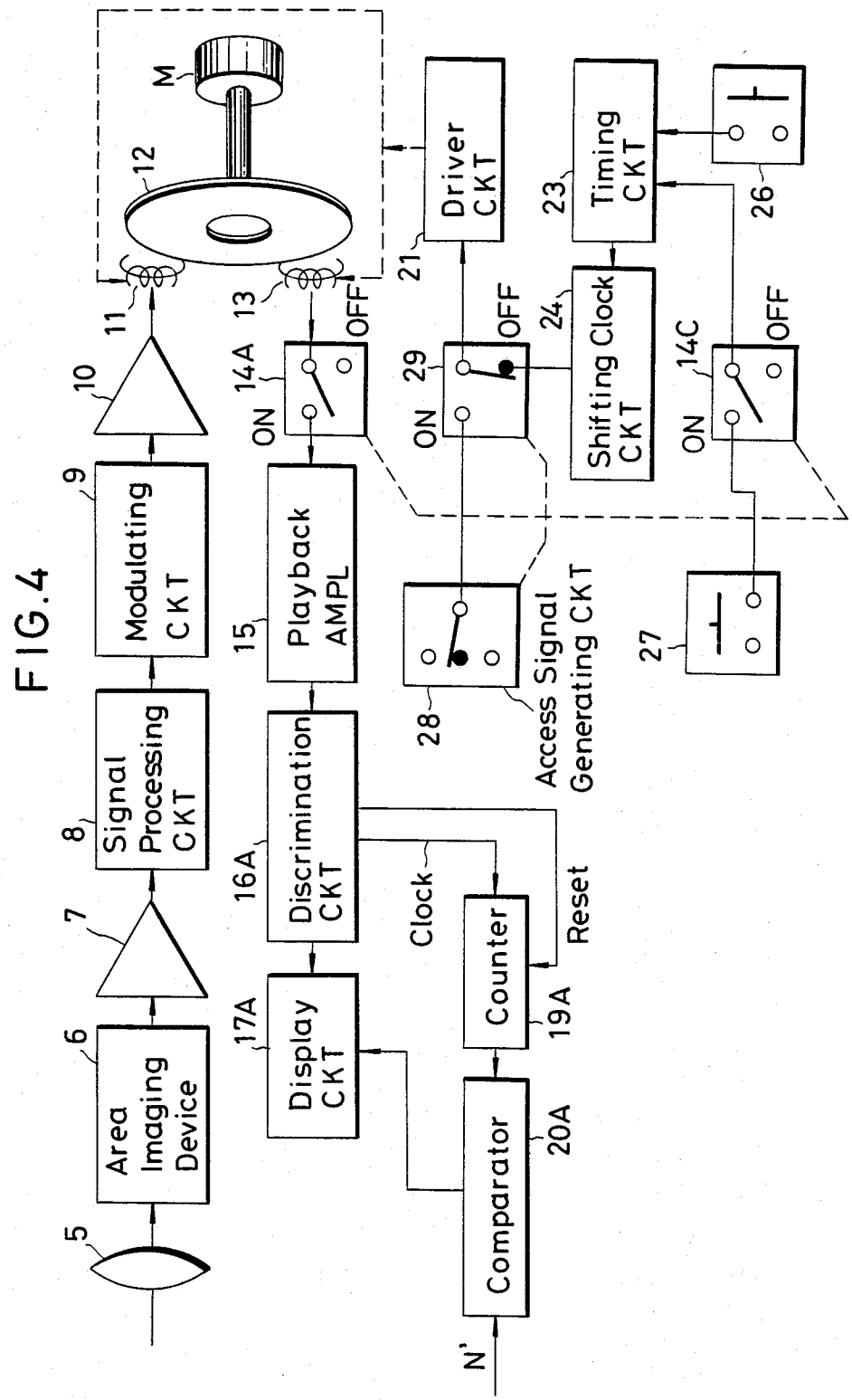

PICTURE RECORDING APPARATUS

BACKGROUND OF THE INVENTION

The present invention relates to a picture recording apparatus and more particularly to a picture recording apparatus so designed that the "good" or "bad" of the recorded condition of a still picture signal is confirmed easily.

Generally, the method of photographing by a still picture camera using a silver salt film as a medium has been known widely as a still picture recording method. With this method, however, the confirmation just after the photographing of whether the recording of a photographed picture has been effected perfectly can be accomplished only after the performance of the required chemical treatments. For instance, any inferior photographing due to any of various causes, e.g., improper exposure, inaccurate focussing, hand shaking and improper loading of the medium can be confirmed only after the completion of the development, printing, enlargement, etc., of the medium. There is another disadvantage that the chemical treatments require specific equipment and place, that the time required for the treatments is long and that the required confirmation cannot be made at the scene of photographing.

On the other hand, a method is known in the art in which a still picture is subjected to photoelectric conversion by an image pickup tube, photoelectric image device or the like and a still picture signal is recorded on a magnetic recording medium. With this method, after the recording of the picture signal on the magnetic medium the recorded signal can be reproduced by a picture playback unit thus producing a still picture and moreover, due to the fact that the picture is reproduced in the form of an electric signal, the quality of the photographing can be determined by means of simple processings in a considerably short period of time as compared with the case where the recording is effected by means of a silver salt film.

However, this known picture recording apparatus of the magnetic type has the danger of causing the following problems during the photographing.

In other words, there are various problems such as a circuit malfunction within the apparatus during the photographing, problems due to the recording medium, such as, improper contact between the recording head and the magnetic sheet or the like, the deposition of dust on the sheet or the head due to the opening and closing of the medium loading and unloading opening in case the recording medium can be inserted and removed from the photographic apparatus or the deposition of the magnetic powder on the head due to the contact between the head and the sheet.

Consequently, this type of magnetic recording apparatus involves causes which tend to cause an inferior photographing and therefore there has been the need for easy confirmation of the quality of a photograph immediately after its photographing.

SUMMARY OF THE INVENTION

It is an object of the present invention to provide a picture recording apparatus so designed that whether the recording of a still picture signal on recording means is complete can be easily confirmed just after the photographing.

It is another object of the invention to provide a picture recording apparatus so designed that the "good" or "bad" of a still picture signal stored on memory means by photographing and corresponding to one frame can be determined before the next photographing.

It is still another object of the invention to provide a picture recording apparatus so designed that if the still picture signal on a first memory unit of memory means is discriminated "good", a still picture signal obtained by the next photographing is stored on a second memory unit, and if the discrimination is "bad", the stored content of the first memory unit is replaced with a still picture signal obtained by the next photographing.

It is still another object of the invention to provide a picture recording apparatus so designed that after the discrimination of the quality of a still picture signal stored on a first memory unit, a still picture signal obtained by the next photographing is stored on a second memory unit and also the result of its discrimination is displayed.

Other objects and advantages of the invention will be apparent from the following description, the appending claims and the accompanying drawings.

BRIEF DESCRIPTION OF THE DRAWINGS

FIG. 4 is a block diagram of a control circuit for the apparatus of FIG. 1 including no erase head.

DESCRIPTION OF THE PREFERRED EMBODIMENTS

Figure 1:
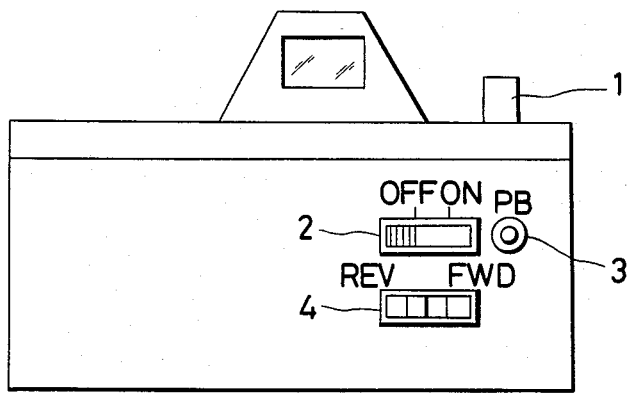
FIG. 1 is a schematic view showing the arrangement of switches of a picture recording apparatus according to an embodiment of the present invention.

Referring to FIG. 1, a picture recording apparatus according to the invention has mounted thereon a photographing start switch 1, a playback function switch 2 (hereinafter simply referred to as a playback SW), a manual playback switch 3 (hereinafter simply referred to as a manual SW), and a head shift switch 4 (hereinafter simply referred to as a shift SW).

The operation modes of these switches will now be described.

(1) Mode 1

(a) With the erase head:

With the playback SW 2 in the ON condition, when the button 1 is depressed, whether the recording of a picture signal on a magnetic sheet is complete is determined immediately after the photographing so that the result is displayed by means of an LED, buzzer or the like and also the recording head is moved to the next track in preparation for the next photographing if the recording is complete. On the contrary, if the recording is not complete, the recorded track is immediately erased by the erase head and the recording head is not moved but held in the current position in preparation for the next photographing.

In this mode, if the recorded condition is not complete, the recorded track is erased so as to be recorded anew and thus the photographing can be made anew without wasting the track.

(b) Without the erase head:

With the playback SW2 in the ON condition, when the photographing start button 1 is depressed, after the recording whether the recording of the picture signal on the magnetic sheet is compete is discriminated immediately so that the result is displayed and the recording head is moved to the next track irrespective of the result of the discrimination.

In this mode, although the incompletely recorded track is wasted, the photographer is informed of the incomplete recording and called upon to make a decision as to whether the same object or scene is to be recorded on the next track again.

(2) Mode 2

During the periods other than the photographing, the playback head is moved by the shift SW 4 to selected one of the tracks whose recorded condition is to be confirmed and then the manual SW 3 is depressed thereby reproducing the track. Thus, a decison is made as to whether any picture signal has been recorded on the track and whether the recorded condition is complete if there is the record and the result is displayed.

With the apparatus including the erase head, the recording head is moved to the next track if the recording is complete, whereas if the recording is incomplete the track is erased by the erase head and the recording head is not moved but held in the current position in preparation for the next photographing.

With the apparatus including no erase head, this mode serves simply as a mode for confirming the quality of the recorded condition and the recording head is moved to the next track irrespective of the result of the quality discrimination.

This mode has the effect for example of obtaining the recorded information on any given track and reconfirming the records upon the change of the recording mediums.

(3) Mode 3 (the case where the recording head also serves as the playback head)

In the case where the playback head is the same head as is used for recording, during the photographing the playback SW 2 is turned off and the playback function is stopped. This mode makes it possible to stop the reproduction discrimination function of the apparatus during the high-speed successive shooting operation in which a still picture for a plurality of frames is photographed at a high speed by continuously depressing the button 1. The reason for providing the mode 3 resides in that while, in the case where the record/playback head is used, the reproduction discrimination is possible only after the completion of the recording of a still picture for one frame, there is no sufficient time for the reproduction, discrimination and erasure during the high speed successive shooting. If it is desired to confirm whether the recording is complete, it is only necessary to make a confirmation on any given track in accordance with the method of the above-mentioned mode 2 after the successive photographing and recording. Also, it is of course possible to confirm the quality of only the final frame in the successive photographing in accordance with the mode 1.

Note that the operational quality can be improved by turning the reproduction SW 2 off in association with the operation for selecting the high-speed successive shooting mode. In addition, the mode 3 has the effect of reducing the power consumption of the apparatus.

Next, the details of the picture recording apparatus including the erase head will be described with reference to FIG. 2.

Now describing the outline of the apparatus, the light beam transmitted through a lens 5 is subjected to photoelectric conversion by a solid-state area imaging device 6 comprising a CCD or the like and the light beam is converted to a picture signal. This picture signal is passed through a head amplifier 7, a recording signal processing circuit 8, a modulating circuit 9 and a recording amplifier 10 and the signal is recorded by a recording head 11 on a magnetic sheet 12 including a plurality of tracks formed on the same circle. In this case, the magnetic sheet 12 is rotated at a constant speed by a motor M. These component parts 5 to 12 are the same with their counterparts in the prior art apparatus and will not be described in any detail.

On the other hand, the recorded picture signal is reproduced by a playback head 13 just after a small time delay due to the distance between the recording head 11 and the playback head 13 and the reproduced signal is supplied to a reproduced signal discrimination circuit 16 through a switch 14A and a playback amplifier 15. Thus, the quality of the picture signal is discriminated and thus a discrimination signal corresponding to the quality of the recorded condition is generated. The result of the discrimination is supplied as a display signal to a display circuit 17, as a head shifting signal to an OR circuit 18 and as a clock pulse to a counter 19.

Figure 2:
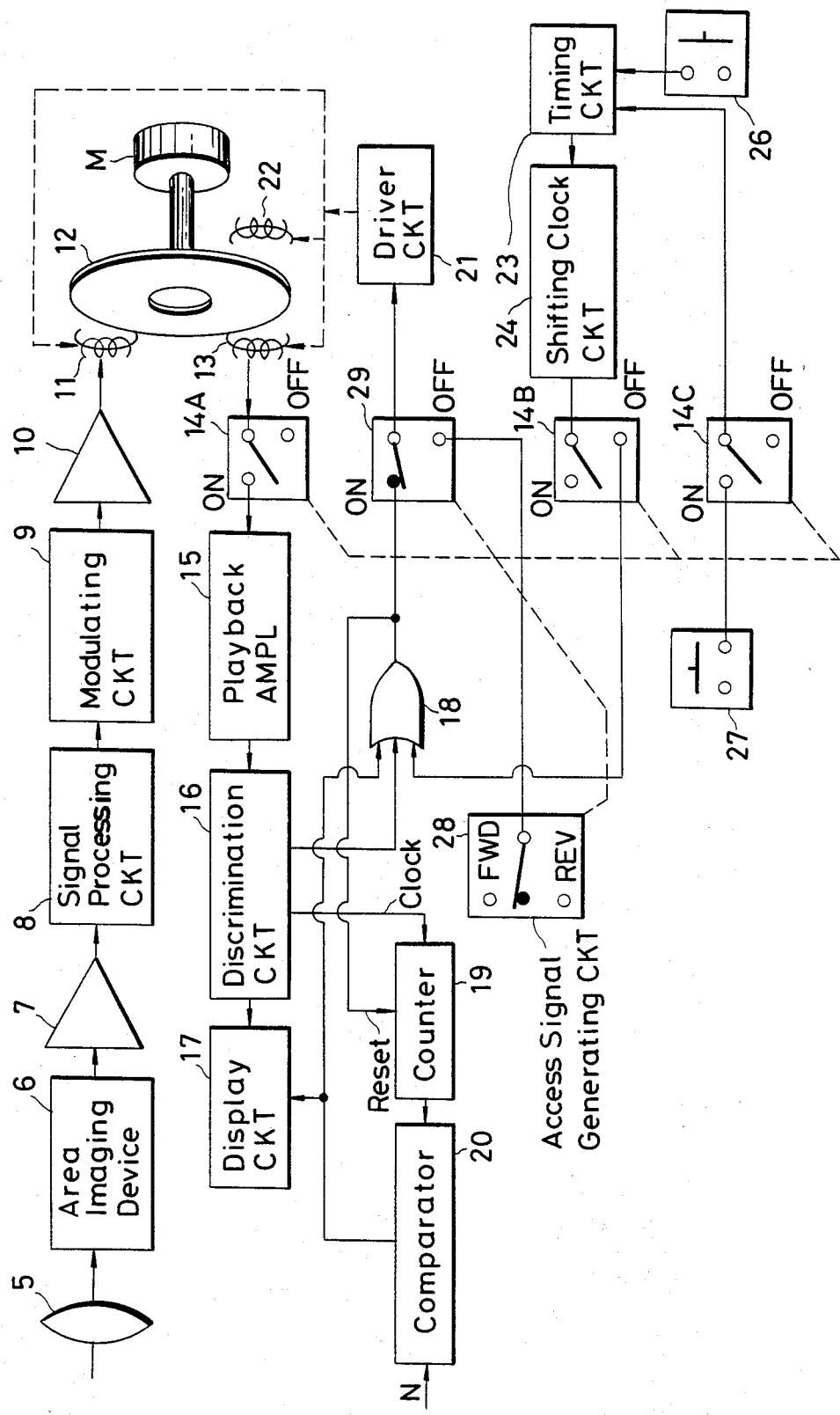
FIG. 2 is a block diagram of a control circuit for the apparatus of FIG. 1 including an erase head.
Figure 3:
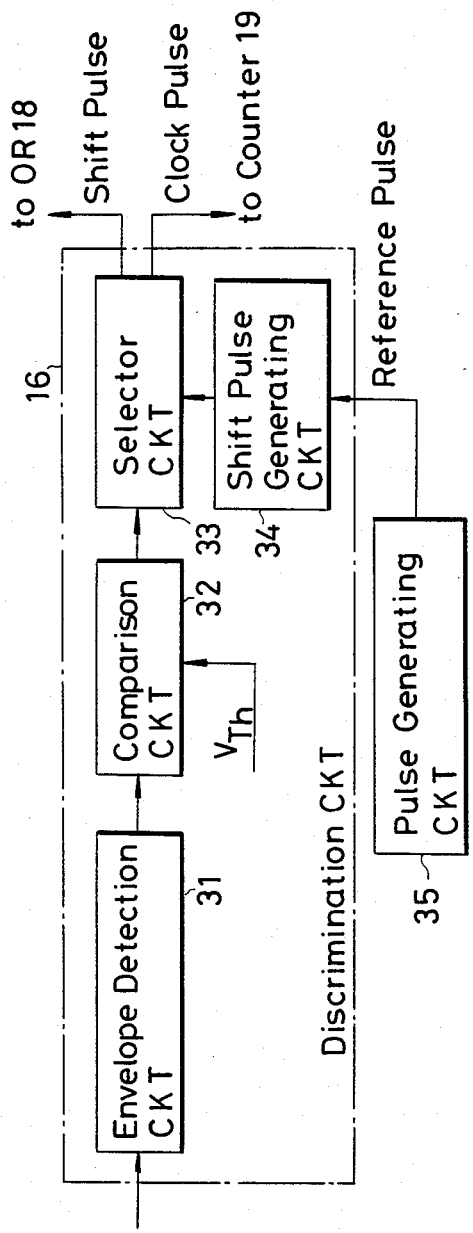
FIG. 3 is a detailed block diagram of the reproduced signal discrimination circuit of FIG. 2.

As shown in FIG. 3, the reproduced signal discrimination circuit 16 is designed so that the envelope level of the reproduced signal from the playback amplifier 15 is detected by an envelope detection circuit 31 and it is then compared with a threshold level Vth by a comparison circuit 32. The comparison circuit 32 is designed so that when the envelope level is higher than the threshold level Vth or when the reproduced signal is "good", as for example, a high level signal is generated and the signal is supplied to a selector circuit 33 and the display circuit 17 (FIG. 2), respectively. A shift pulse generating circuit 34 generates a shift pulse in response to the reference pulse from a reference pulse generating circuit 35. The selector circuit 33 applies the shift pulse to the OR circuit 18 when the high level signal is generated from the comparison circuit 32 or when the reproduced signal is good and the shift pulse is applied as a clock pulse to a counter 19 when the reproduced signal is "bad". The reference pulse generating circuit 35 generates reference pulses for timing the operation of the apparatus as a whole.

The counter 19 counts the clock pulses from the selector circuit 33 in the reproduced signal discrimination circuit 16 or the number of times that the same track is recorded. The count value of the counter 19 is compared with a predetermined constant N by a comparator 20. When the same track is recorded and reproduced N times repeatedly, the comparator 20 determines that the recording of this track is not possible and thus shift pulses are generated to move the heads to the next track, thereby causing the display circuit 17 to display the shift and resetting the counter 19.

A driver circuit 21 transfers the track position of the recording head 11, the playback head 13 and an erase head 22, respectively, through the OR circuit 18 or in response to the shift pulses supplied from the comparator 20. Of course, these heads are in contact with the same track on the magnetic sheet 12 and they are arranged in the order of the recording, playback and erasure in the track running direction. A timing circuit 23 controls all the timings of the recording and playback sections of the apparatus and it is identical with the reference pulse generating circuit 35 of FIG. 3. A head shifting clock circuit 24 is responsive to the pulse from the timing circuit 23 to supply a shift pulse to the OR circuit 18.

In FIG. 2, a photographing start switch 26 corresponds to the button 1 of FIG. 1, playback switches 14A, 14B and 14C to the playback SW 2 and a switch 27 to the manual SW 3, respectively. In the description to follow, the switches 14A to 14C and 27 will be designated by the abbreviations of the corresponding switches. Also, the head shifting SW 4 is included in an access signal generating circuit 28 and a switch 29 is one which performs its switching operation in association with the operation of the head shifting SW 4.

Next, the operation of the circuits in response to the opening and closing of the switches will be described with respect to each of the previously mentioned modes.

(1) Mode 1 (with the erase head)

With the playback SWs 14A, 14B and 14C in the ON condition, when the photographing start switch 26 is depressed, the photographing is effected in response to the various control signals generated from the timing circuit 23 and a picture signal is recorded on the magnetic sheet 12. Immediately after the photographing, the picture signal is reproduced by the playback head 13 and the reproduced picture signal is supplied to the reproduced signal discrimination circuit 16 through the playback SW 14A (in the ON condition) and the playback amplifier 15. The reproduced picture signal may be observed by displaying it on the screen by means of a monitor or the like. The reproduced signal discrimination circuit 16 performs the discrimination by the method shown in FIG. 3 or any other method such as one which discriminates the quality in accordance with the presence of an RF signal in the reproduced signal. As a result, a signal corresponding to the discrimination result is supplied to the display circuit 17 and the display circuit 17 displays the result by means of an LED, buzzer or the like. The display method may be such that the result is displayed only when the recording is complete or the reverse is the case or the display is made in either of the two cases.

When the reproduced picture signal is discriminated "good", the head shifting signals corresponding to one track is supplied to the driver circuit 21 through the OR circuit 18 and the switch 29 (in the ON condition) and the driver circuit 21 advances each of the heads 11, 13 and 22 by one track.

When the discrimination is "bad", no shift signal is supplied to the driver circuit 21 and the heads 11 and 13 are not moved. Thus, the current track positions are maintained and the erase head 22 is operated thereby erasing the track.

Note that the switch 29 is always held in the ON position and it is moved into the OFF position only when the shift SW 4 is moved to the forward position or the reverse position. The access signal generating circuit 28 generates access signals for manually advancing the heads 11 and 13 and the erase head 22 toward the next track or moving the heads backward toward the previous track and the contact of the shift SW 4 is usually held in the central position. When the shift SW 4 is moved to one side, the switch 29 is moved to the OFF position so that the access signals from the circuit 28 are supplied to the head driver circuit 21 and the heads 11 and 13 and the erase head 22 are advanced or moved backward. The forward access signal may be distinguished from the backward access signal by reversing the signal polarity.

On the other hand, when the reproduced signal discrimination circuit 16 discriminates "bad" N times repeatedly, this fact is determined by the counter circuit 19 and the comparator 20 and shift pulses are supplied to the driver circuit 21 through the OR circuit 18, while the fact is displayed by the display circuit 17 and the counter 19 is reset, as mentioned previously.

(2) Mode 2

As mentioned previously, this mode is one for confirming the recorded condition of given one of the tracks selected by the shift SW 4 under the conditions other than the photographing condition. Thus, with the playback SWs 14A, 14B and 14C in the ON condition, when the manuual SW 27 is turned on, a reproduction start signal is applied to the timing circuit 23 through the playback SW 14C and the control signals required for reproduction confirmation purposes are generated from the timing circuit 23 thereby initiating the reproduction of the selected track and operating the respective circuits in accordance with the reproduction and discrimination sequence of the mode 1.

(3) Mode 3

As mentioned previously, this mode is such that the reproduction function is stopped during the successive shooting or the like and the playback SWs 14A, 14B and 14C are all in the OFF condition.

In this case, when the photographing start switch 26 is turned on, the timing circuit 23 comes into operation and the photographing and recording are effected. Also, the head shifting pulses from the head shifting clock circuit 24 are supplied to the driver circuit 21 through the OFF contact of the playback SW 14B, the OR circuit 18 and the switch 29 and the heads 11 and 13 are each moved one track automatically.

On the other hand, in the case of the apparatus having no erase head, the required circuits for the photographing and recording are the same with those of FIG. 2 as shown in FIG. 4 and the only difference is that in the reproduction circuits a reproduced signal discrimination circuit 16A supplies a display signal to a display circuit 17A to display the result of the discrimination but no head shifting signal is generated. The reason is that the heads 11 and 13 are moved to the next track irrespective of the result of the discrimination of a reproduced picture signal in the apparatus. As a result, each time the recording and reproduction of a still picture signal for one frame are completed, the timing circuit 23 supplies a signal to the head shifting clock circuit 24 and upon receipt of the signal the clock circuit 24 supplies the head shifting signals to the head driver circuit 21 through the switch 29.

Figure 5:
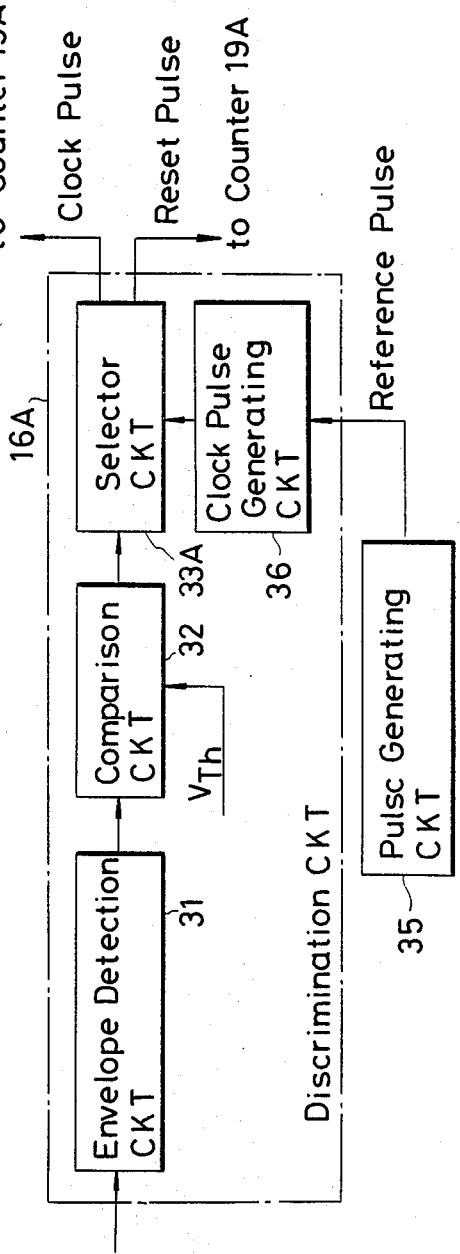
FIG. 5 is a detailed block diagram of the reproduced signal discrimination circuit of FIG. 4.

In this case, as shown in FIG. 5, the reproduced signal discrimination circuit 16A is practically the same with that of FIG. 3 except a selector circuit 33A and a clock pulse generating circuit 36. The selector circuit 33A is designed so that the clock pulse from the clock pulse generating circuit 36 is supplied as a clock signal to a counter 19A when the output from the comparison circuit 32 is indicative of the "bad" reproduced signal and the clock pulse is supplied as a reset signal to a counter 19A when the reproduced signal is "good". The count value of the counter 19A is compared with a predetermined constant $N'$ by a comparator 20A. In this way, when the heads are moved to the different tracks $N'$ times so that the recording and reproduction are effected $N'$ times and the discrimination of "bad" takes place N' times, the magnetic sheet or the like is determined as not capable of recording thereby causing a display circuit 17A to display that the sheet must be replaced or the heads must be subjected to cleaning. The counter 19A is also reset when a sheet is loaded in the camera.

Thus, in accordance with the above-described embodiments, due to the fact that just after each photographing and recording the track is reproduced automatically so that quality of the recording is discriminated and its result is displayed, the track is immediately erased and the photographing is effected again in the case of the apparatus including the erase head. Also, even in the case of the apparatus including no erase head, the quality of the recording is displayed so that if, for example, the photographing and recording of an important scene result in a failure, the scene can be photographed again. Further, if a partly recorded magnetic sheet is loaded in the apparatus, any unrecorded track can be searched by means of the manual switch.

While, in the above-described embodiments, the memory means comprises a magnetic sheet, the invention is not limited to it and any other magnetic recording medium such as a magnetic sheet or magnetic drum may be used. Further, the invention can be applied to any other recording system such as a photomagnetic recording system or a purely electronic recording system employing a semiconductor memory having a memory capacity for a plurality of frames (e.g., a shift register RAM or magnetic bubble memory).

What is claimed is:

1. A picture recording apparatus comprising:
a photographing optical system;
   image pickup means for photoelectrically converting an image of an object formed by said optical system to a still picture signal;
   memory means having a plurality of memory units including at least one first memory unit and one second memory unit, each of said memory units being capable of storing a still picture signal;
   means for generating a reference signal; and
   discriminating means for comparing a signal reproduced from said still picture signal memory means with said reference signal and for determining whether a still picture signal stored in said first memory unit is "good" or "bad".

2. An apparatus according to claim 1 wherein said memory means writes a still picture signal produced by the next photographing in said second memory unit in response to said discrimination means comparison which produces a "good" signal, and replaces the stored content of said first memory unit with a still picture signal produced by the next photographing in response to said discrimination means comparison which produces a "bad" signal.

3. An apparatus according to claim 2 wherein each of said memory units stores said still picture signal corresponding to one frame.

4. An apparatus according to claim 2 wherein said discriminating means compares the envelope level of a reproduced signal of said still picture from said first memory unit with a level of said reference signal.

5. An apparatus according to claim 1 wherein said memory means stores a still picture signal produced by said next photographing in said second memory unit after said discrimination means comparison.

6. An apparatus according to claim 5 wherein said discriminating means compares the envelope level of a reproduced signal of said still picture from said first memory unit with a level of said reference signal.

7. A picture recording apparatus comprising:
a photographing optical system;
   image pickup means for photoelectrically converting an image of an object formed by said optical system to a still picture signal;
   memory means having a plurality of memory units including at least one first memory unit and one second memory unit, each of said memory units being capable of storing a still picture signal corresponding to one frame;
   discriminating means for discriminating whether a still picture signal stored in said first memory unit is "good" or "bad"; and
   said memory means writing a still picture signal corresponding to one frame and produced by the next photographing in said second memory unit when said discrimination results in "good", and replacing the stored content of said first memory unit with a still picture signal corresponding to one frame and produced by the next photographing when said discrimination results in "bad",
wherein whether said still picture signal corresponding to one frame and stored in said first memory unit is "good" or "bad" is determined by comparing the envelope level of a reproduced signal thereof with a predetermined reference level by said discriminating means.

8. An apparatus according to claim 7, further comprising a counter for integrating clock pulses each thereof being generated from said discriminating means when the discrimination thereof results in "bad" thereby counting the number of times of recording in the same memory unit, and a comparison circuit for comparing said counted number of said counter with a predetermined number of times so as to generate shift pulses and move heads to the next memory unit when said counter output is greater than said predetermined number of times.

9. A picture recording apparatus comprising:
a photographing optical system;
   image pickup means for photoelectrically converting an image of an object formed by said optical system to a still picture signal;
   memory means having a plurality of memory units including at least one first memory unit and one second memory unit, each of said memory units being capable of storing a still picture signal corresponding to one frame;
wherein said memory means comprises a magnetic recording medium, wherein said discriminating means comprises a playback head for reading a still picture signal recorded in said recording medium and a reproduced signal discrimination circuit for receiving a reproduced signal from said playback head to discriminate the recorded condition thereof and generate a "good" or "bad" discrimination signal, and wherein said apparatus further comprises a driver circuit responsive to said discrimination signal from said reproduced signal discrimination circuit to move a recording head for writing a still picture signal in said memory means and said playback head.

10. An apparatus according to claim 9, further comprising an erase head for erasing said still picture signal recorded by said recording head when said reproduced signal discrimination circuit generates said "bad" discrimination signal.

11. A picture recording apparatus comprising:

a photographing optical system;

image pickup means for photoelectrically converting an image of an object formed by said optical system to a still picture signal;

memory means having a plurality of memory units including at least one first memory unit and one second memory unit, each of said plurality of memory units being capable of storing a still picture signal corresponding to one frame;

discriminating means for discriminating whether a still picture signal stored in said first memory unit is "good" or "bad" before the next photographing;

display means for displaying the result of said discrimination; and said memory means stores a still picture signal corresponding to one frame and produced by said next photographing in said second memory unit after said discrimination, wherein said discriminating means compares the level of an envelope of a reproduced signal of said still picture signal corresponding to one frame and stored in said first memory unit with a predetermined reference level thereby discriminating whether said still picture signal is "good" or "bad".

12. An apparatus according to claim 11, further comprising a counter for integrating a clock pulse generated from said discriminating means each time the discrimination thereof results in "bad" and thereby counting the number of successive times that the still picture signals stored in said memory means are discriminated "bad", and a comparator for comparing said counted number of said counter with a predetermined number of times such that when the output of said counter is greater than said predetermined number of times display means is instructed that said memory means cannot be recorded.

* * * * *